(12) United States Patent
Valente

(10) Patent No.: US 10,871,364 B2
(45) Date of Patent: Dec. 22, 2020

(54) MEASUREMENT SYSTEM

(71) Applicant: Gregory M. Valente, Greenville, SC (US)

(72) Inventor: Gregory M. Valente, Greenville, SC (US)

( * ) Notice: Subject to any disclaimer, the term of this patent is extended or adjusted under 35 U.S.C. 154(b) by 223 days.

(21) Appl. No.: 16/122,353

(22) Filed: Sep. 5, 2018

(65) Prior Publication Data
US 2020/0072592 A1 Mar. 5, 2020

(51) Int. Cl.
*G01B 5/02* (2006.01)
*G01B 5/00* (2006.01)
*G01D 5/00* (2006.01)

(52) U.S. Cl.
CPC ............... *G01B 5/025* (2013.01); *G01D 5/00* (2013.01); *G01B 5/0014* (2013.01)

(58) Field of Classification Search
CPC ........ G01D 5/00; G01B 11/14; G01B 5/0014; G01B 5/025
USPC ... 33/555.1, 555.4, 772, 776, 744, 756, 1 N, 33/1 PT
See application file for complete search history.

(56) References Cited

U.S. PATENT DOCUMENTS

| | | | | |
|---|---|---|---|---|
| 4,330,941 A * | 5/1982 | Haley | .................... | G01B 5/043 33/776 |
| 4,502,233 A * | 3/1985 | Boitz | ...................... | F02B 67/06 33/412 |
| 4,700,484 A | 10/1987 | Frank et al. | | |
| 4,904,939 A * | 2/1990 | Mian | ........................ | G01B 7/06 246/169 R |
| 5,036,598 A * | 8/1991 | Culling | .................... | G01B 3/12 33/776 |
| 5,197,200 A | 3/1993 | Bahr et al. | | |
| 5,406,715 A * | 4/1995 | Koizumi | .............. | G01B 3/1004 33/706 |
| 6,877,245 B2 * | 4/2005 | Brohammer | ......... | A63B 67/068 273/108 |
| 6,889,444 B2 * | 5/2005 | Trout | ....................... | G01B 3/12 33/755 |
| 6,978,553 B2 * | 12/2005 | Doublet | ................ | G01B 5/245 33/1 G |
| 7,047,659 B2 * | 5/2006 | Holland | .............. | G01B 3/1084 33/760 |
| 7,146,743 B2 * | 12/2006 | Oura | ...................... | G01D 5/363 33/756 |
| 7,173,197 B1 * | 2/2007 | Kasperek | ............... | A01K 97/00 177/131 |
| 10,393,490 B2 * | 8/2019 | Park | ........................ | G01B 3/10 |
| 2002/0170201 A1 * | 11/2002 | Trout | ....................... | G01B 3/12 33/773 |
| 2003/0145477 A1 * | 8/2003 | Fukuhara | ................ | G01C 7/04 33/521 |

(Continued)

*Primary Examiner* — Yaritza Guadalupe-McCall
(74) *Attorney, Agent, or Firm* — Steve LeBlanc, LLC

(57) ABSTRACT

A measurement system for measuring a dimension of an object includes a rotary encoder and a rotatable wheel connected to the rotary encoder. A first transfer roller is separated from the rotary encoder by a first predetermined distance. A connector having an inner surface opposed to an outer surface engages with the rotatable wheel so that the connector moves in sync with the rotatable wheel. The connector engages between the first transfer roller and the object so that the connector moves in sync with the object.

17 Claims, 6 Drawing Sheets

(56) References Cited

U.S. PATENT DOCUMENTS

2005/0011081 A1\* 1/2005 Brohammer ............ G01B 3/11
33/756
2020/0072592 A1\* 3/2020 Valente .................... G01D 5/00

\* cited by examiner

MEASUREMENT SYSTEM

FIELD OF THE INVENTION

The present invention generally involves a measurement system for measuring a dimension of an object. In particular embodiments of the present invention, the measurement system may include a rotary encoder to measure a dimension of a relatively large object without requiring the rotary encoder to be located adjacent to or in the same environment as the large object.

BACKGROUND OF THE INVENTION

Many mechanical components require precise dimensions to function properly, and the precise dimensions can be difficult to achieve and measure during manufacture and/or maintenance of the mechanical components, particularly as the size of the mechanical component increases. For example, a rotary encoder may be used to precisely measure a circumference of a rotor. Specifically, a calibrated wheel may be connected to the rotary encoder and then placed directly against the rotor. Rotation of the rotor causes the calibrated wheel to rotate, and the rotary encoder can precisely determine the circumference of the rotor based on the rotation of the calibrated wheel.

While effective at precisely measuring some mechanical components, various known disadvantages exist with this arrangement, particularly as the size of the mechanical component increases. For example, the calibrated wheel connected to the rotary encoder is typically made of metal, and any change in the dimensions of the calibrated wheel, such as by heat, erosion, or scoring, or any slippage between the calibrated wheel and the mechanical component reduces the accuracy of any measurement. Conversely, the calibrated wheel may score the mechanical component, resulting in damage to the mechanical component. Another disadvantage is that the surface of the mechanical component may include slots, keyways, or other irregular indentions which prevent continuous contact between the calibrated wheel and the mechanical component, reducing the accuracy of any measurement. Lastly, the mechanical component may be located in environments having ambient conditions (e.g., noise, temperature, or water) that are not conducive to accurate measurements or may even damage the rotary encoder.

Therefore, the need exists for an improved measuring system for measuring a dimension of an object that addresses one or more of the disadvantages identified above.

BRIEF DESCRIPTION OF THE INVENTION

Aspects and advantages of the invention are set forth below in the following description, or may be obvious from the description, or may be learned through practice of the invention.

One embodiment of the present invention is a measurement system for measuring a dimension of an object. The measurement system includes a rotary encoder, and a rotatable wheel is connected to the rotary encoder. A first transfer roller is separated from the rotary encoder by a first predetermined distance. A connector having an inner surface opposed to an outer surface engages with the rotatable wheel so that the connector moves in sync with the rotatable wheel. The connector engages between the first transfer roller and the object so that the connector moves in sync with the object.

An alternate embodiment of the present invention is a measurement system for measuring a dimension of an object that includes a rotary encoder separated from the object by a first predetermined distance. A rotatable wheel is connected to the rotary encoder. A connector having an inner surface opposed to an outer surface engages with the rotatable wheel and the object so that the rotatable wheel moves in sync with the object.

In yet another embodiment of the present invention, a measurement system for measuring a dimension of an object includes a rotary encoder separated from the object by a first predetermined distance. A rotatable wheel is connected to the rotary encoder. The measurement system further includes a means for engaging the rotatable wheel to the object so that the rotatable wheel moves in sync with the object.

Those of ordinary skill in the art will better appreciate the features and aspects of such embodiments, and others, upon review of the remainder of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
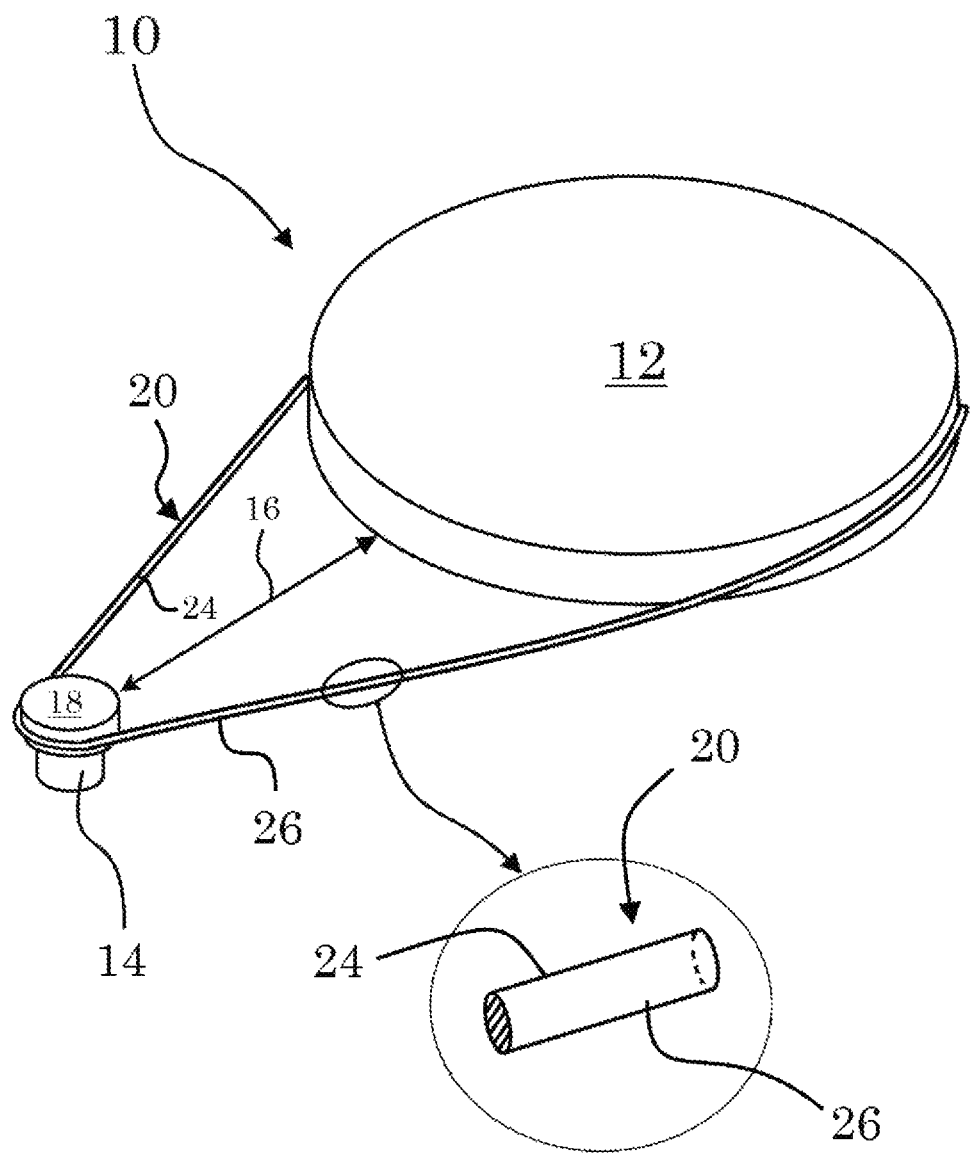
FIG. 1 is a perspective view of a measurement system according to a first embodiment of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Embodiments of the present invention provide a measurement system 10 for measuring a dimension of an object 12. All references to an "object" in the preamble and body of the claims is for contextual purposes only and is not intended to be a limitation of any claim. As used herein, the terms "first," "second," and "third" may be used interchangeably to distinguish one component from another and are not intended to signify location or importance of the individual components. As used herein, the term "in sync" means at the same time and for the same distance. For example, two objects move in sync if the two objects move at the same time and if a reference point on each object moves the same distance.

Figure 2:
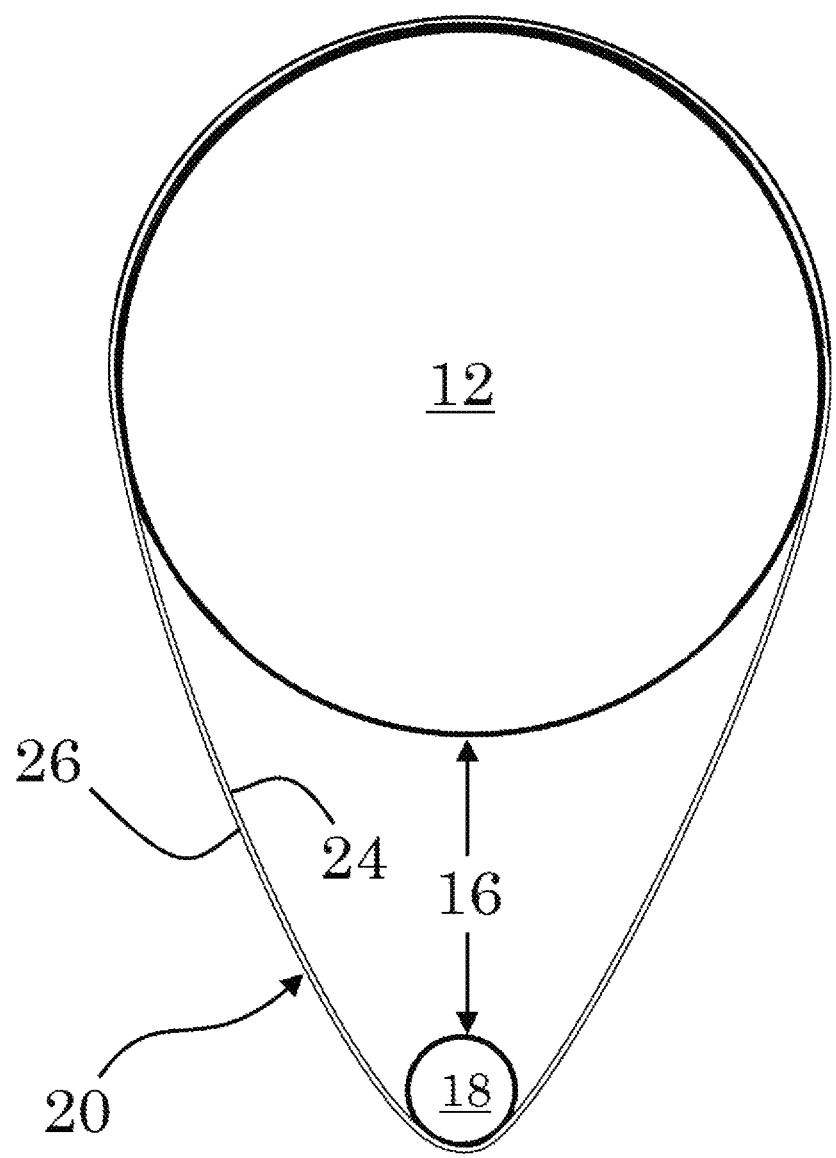
FIG. 2 is a top plan view of the measurement system shown in FIG. 1.

FIGS. 1 and 2 provide perspective and top plan views, respectively, of the measurement system 10 according to a first embodiment of the present invention. As shown in FIGS. 1 and 2, the measurement system 10 includes a rotary encoder 14 separated from the object 12 by a predetermined distance 16. The rotary encoder 14 may be a conventional instrument known in the art for precisely measuring angular displacement. A rotatable wheel 18 having a known diameter and circumference may be connected to the rotary encoder 14. In this manner, the rotary encoder 14 may accurately convert each rotation or fractional rotation of the rotatable wheel 18 into a length or distance measurement.

The predetermined distance 16 between the rotary encoder 14 and the object 12 is selected according to the particular object 12 being measured and/or environment of the measurement to enhance the accuracy of the measurement and reduce the risk of damage to the object 12 and/or the rotary encoder 14. For example, the object 12 may be located in an environment with ambient noise, temperature, and/or water conditions, and exposure of the rotary encoder 14 to these ambient conditions may damage the rotary encoder 14 and/or the rotatable wheel 18. Therefore, an operator may select the predetermined distance 16 between the object 12 and the rotary encoder 14 to allow the rotary encoder 14 to be located far enough away from the object 12 to reduce or avoid any environmental conditions that might affect the measurements.

The measurement system 10 further includes a means for engaging the rotatable wheel 18 of the rotary encoder 14 to the object 12 so that the rotatable wheel 18 moves in sync with the object 12. The function defined by the means is to engage the rotatable wheel 18 to the object 12 so that the rotatable wheel 18 moves at the same time and for the same distance as the object 12. The structure for performing this function may be a connector, belt, chain, rope, intermediate rotatable wheel, or any combination of equivalent structures known in the art for rotatably connecting one component to another. In the particular embodiment shown in FIGS. 1 and 2, the structure for performing this function is a connector 20 having an inner surface 24 opposed to an outer surface 26. The inner surface 24 of the connector 20 engages with the object 12 and the rotatable wheel 18 to form a loop around the object 12 and the rotatable wheel 18 so that the connector 20 rotatably couples the rotatable wheel 18 to the object 12. In this manner, the object 12, rotatable wheel 18, and connector 20 all move in sync with one another.

The measurement system 10 shown in FIGS. 1 and 2 can thus measure a dimension of the object 12 by rotating the object 12. Rotation of the object 12 causes the connector 20 to move in sync with the object 12, and the connector 20 in turn causes the rotatable wheel 18 to move in sync with the object 12. As the rotatable wheel 18 rotates, the rotary encoder 14 accurately converts each rotation or fractional rotation of the rotatable wheel 18 into a length or distance measurement. In this manner, the rotary encoder 14 can accurately measure a dimension of the object 12 without being exposed to any conditions that may damage the rotatable wheel 18 and/or electronics in the rotary encoder 14 or reduce the accuracy of the measurement.

Figure 3:
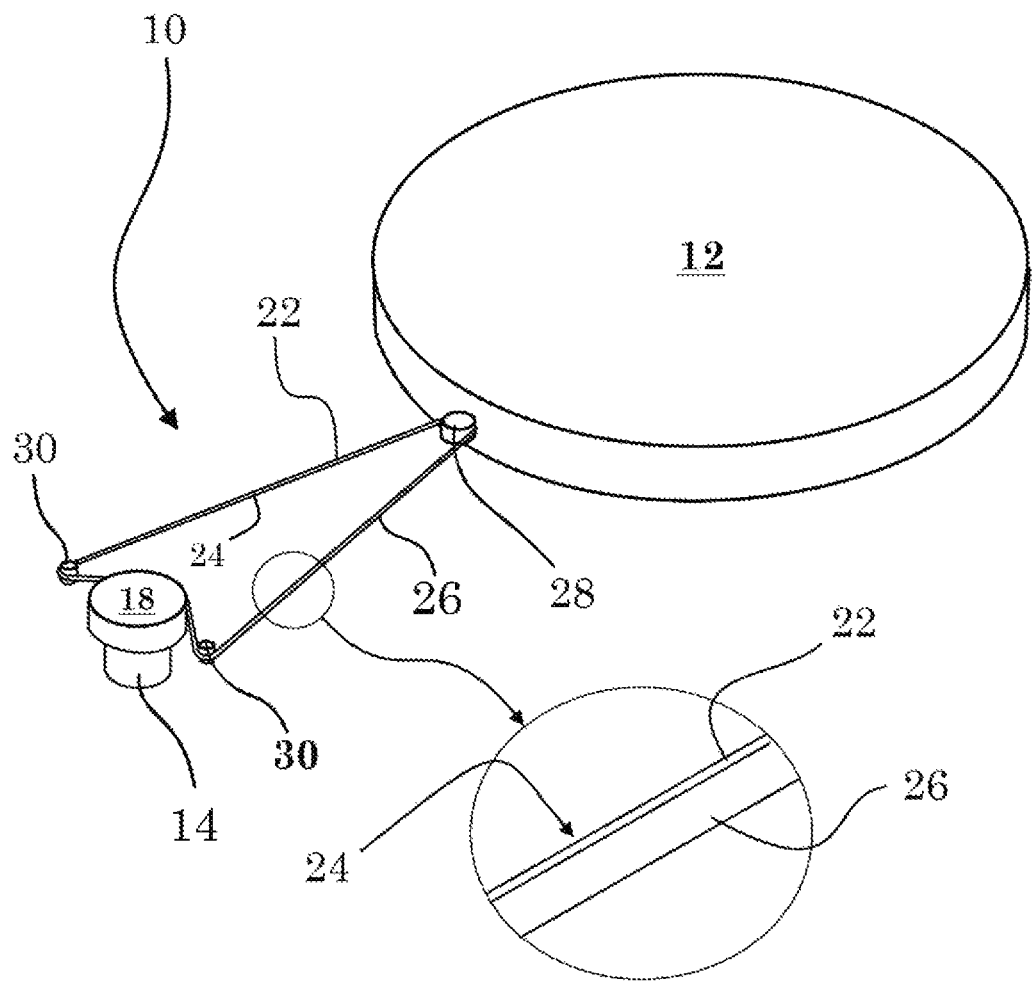
FIG. 3 is a perspective view of a measurement system according to a second embodiment of the present invention.
Figure 4:
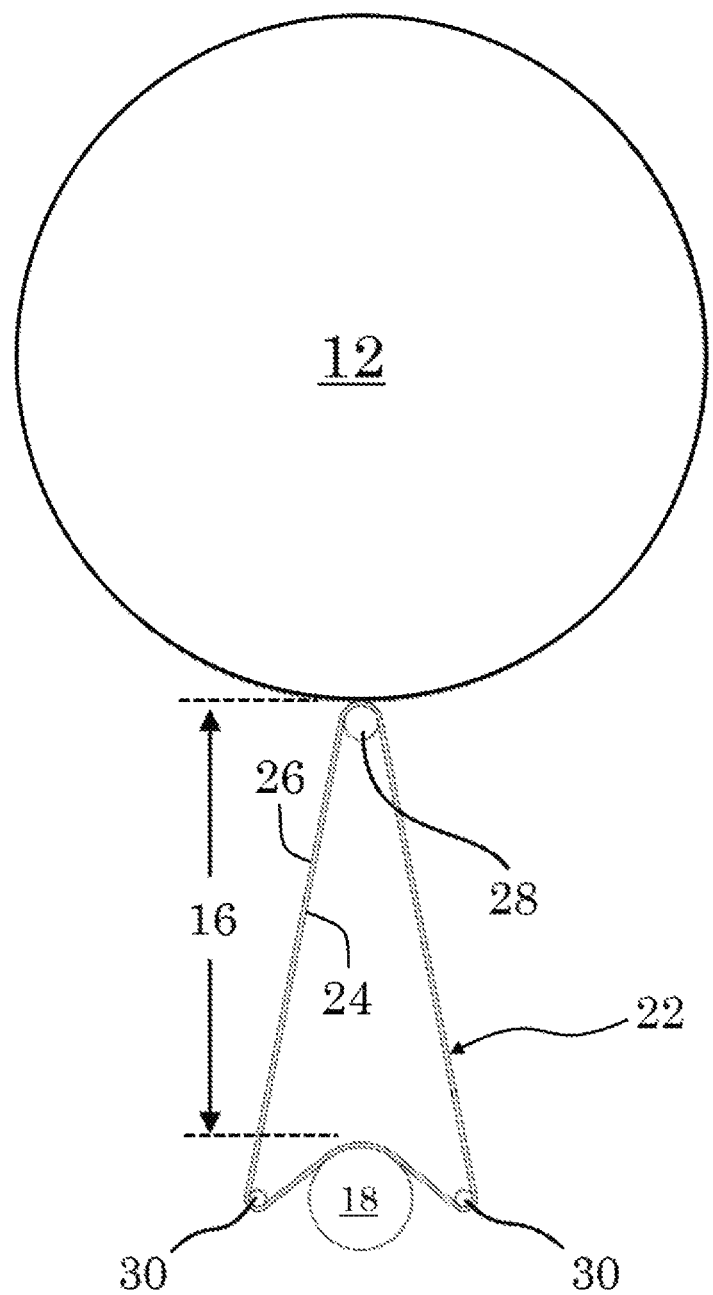
FIG. 4 is a top plan view of the measurement system shown in FIG. 3.

FIGS. 3 and 4 provide perspective and top plan views of the measurement system 10 according to a second embodiment of the present invention. As shown in FIGS. 3 and 4, the measurement system 10 again includes the rotary encoder 14 separated from the object 12 by the predetermined distance 16, as previously described with respect to the embodiment shown in FIGS. 1 and 2. In this particular embodiment, the structure for the means for engaging the rotatable wheel 18 to the object 12 so that the rotatable wheel 18 moves in sync with the object 12 includes a transfer belt 22 and also a transfer roller 28. The transfer belt 22 may include the inner and outer surfaces 24, 26, as previously described with respect to the embodiment shown in FIGS. 1 and 2. The transfer roller 28 may be separated from the rotary encoder 14 by the first predetermined distance 16. As shown in FIGS. 3 and 4, the transfer belt 22 engages between the transfer roller 28 and the object 12 so that the outer surface 26 of the transfer belt 22 engages with the object 12. As a result, the transfer belt 22 moves in sync with the object 12.

The particular embodiment shown in FIGS. 3 and 4 further includes a plurality of tension rollers 30 that support at least a portion of the outer surface 26 of the transfer belt 22 against the rotatable wheel 18 of the rotary encoder 14. The tension rollers 30 may be spring-loaded to provide a desired tension of the transfer belt 22 against the rotatable wheel 18. Moreover, the position of the tension rollers 30 with respect to the rotatable wheel 18 allows the outer surface 26 of the transfer belt 22 to engage with the rotatable wheel 18 of the rotary encoder 14 so that the transfer belt 22 moves in sync with the rotatable wheel 18 of the rotary encoder 14.

Figure 5:
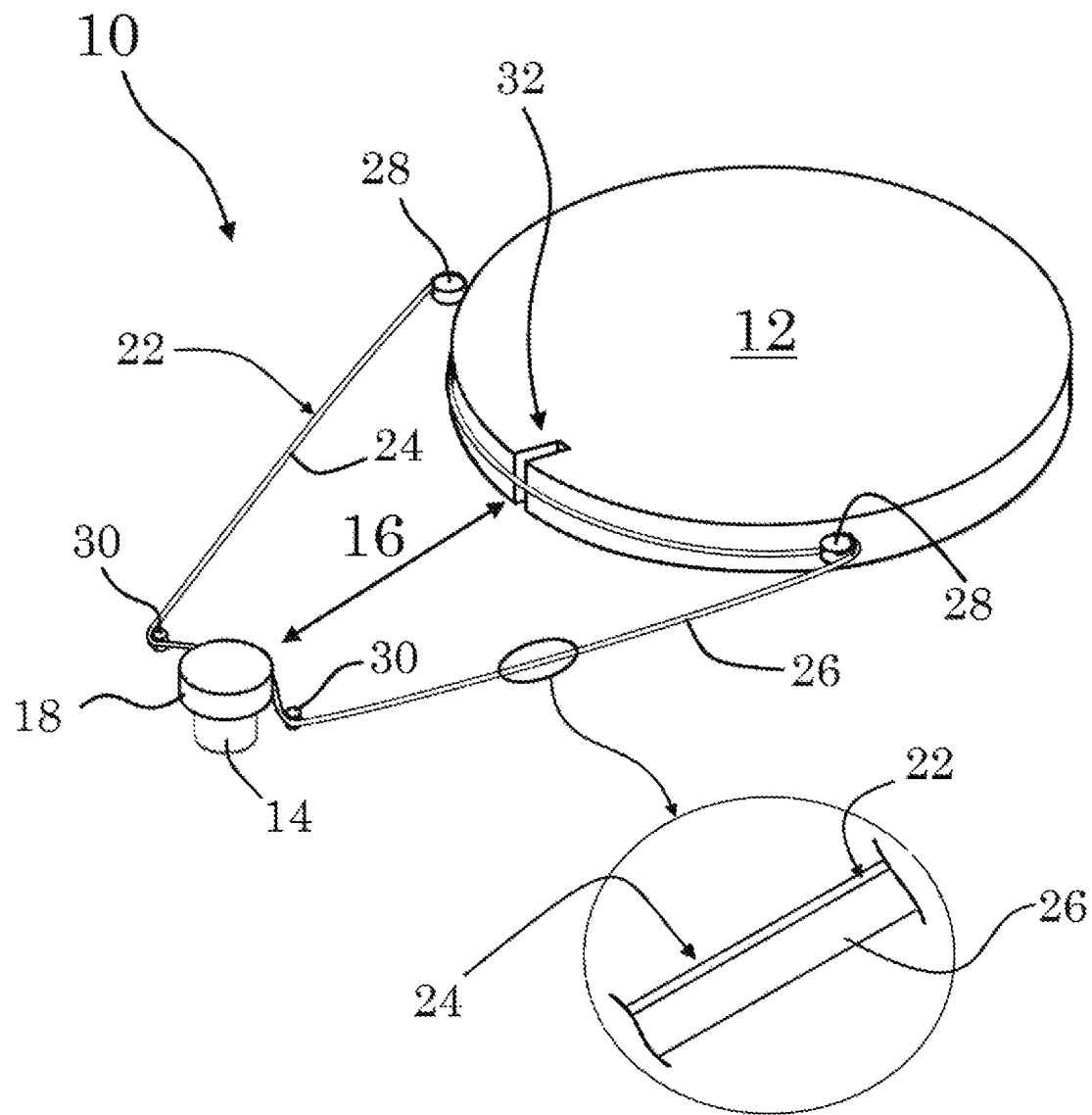
FIG. 5 is a perspective view of a measurement system according to a third embodiment of the present invention.
Figure 6:
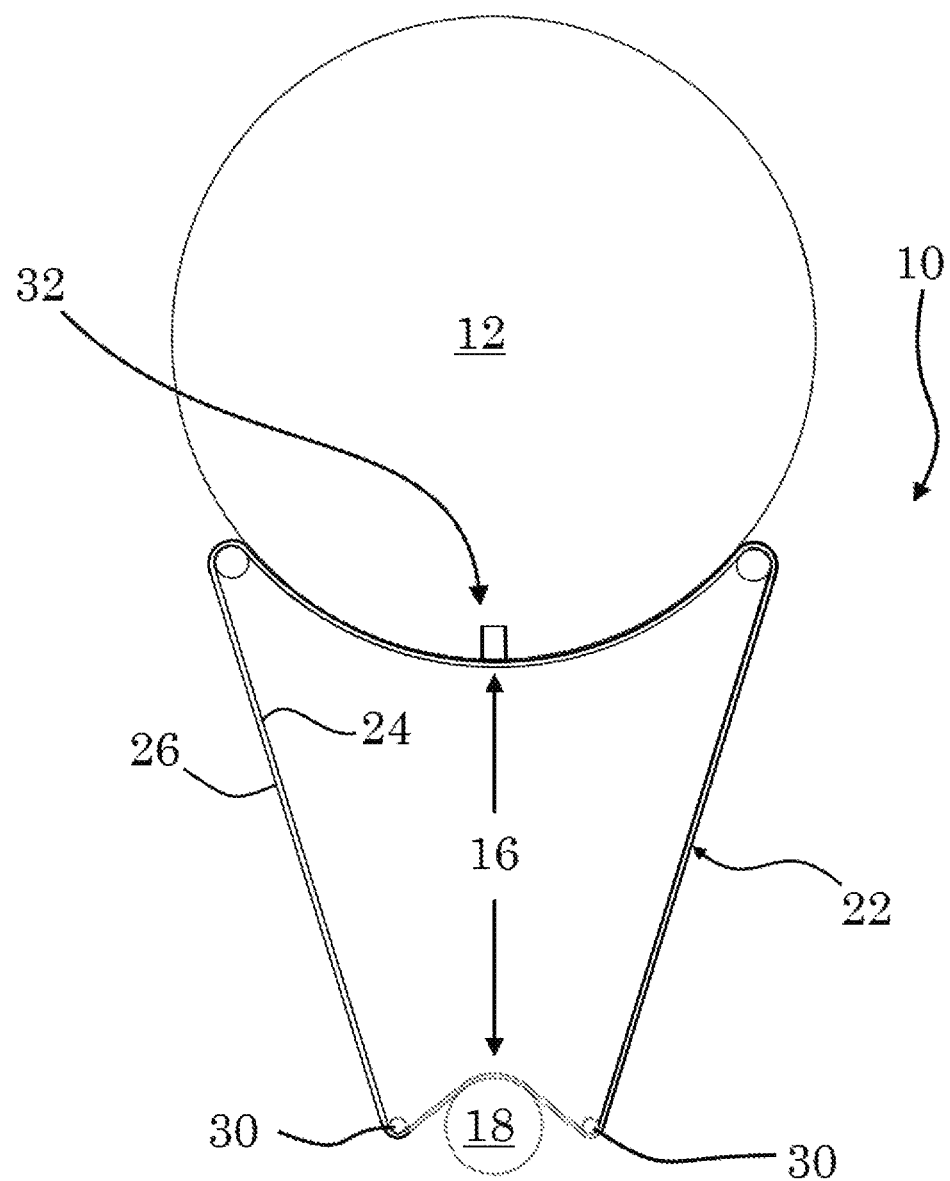
FIG. 6 is a top plan view of the measurement system shown in FIG. 5.

FIGS. 5 and 6 provide perspective and top plan views of the measurement system 10 according to a third embodiment of the present invention. As shown in FIGS. 5 and 6, the measurement system 10 again includes the rotary encoder 14 separated from the object 12 by the predetermined distance 16 and the tension rollers 30, as previously described with respect to the embodiments shown in FIGS. 1-4. In this particular embodiment, the structure for the means for engaging the rotatable wheel 18 to the object 12 so that the rotatable wheel 18 moves in sync with the object 12 includes the transfer belt 22 and a plurality of transfer rollers 28. The transfer belt 22 may include the inner and outer surfaces 24, 26, as previously described with respect to the embodiments shown in FIGS. 3 and 4. The plurality of transfer rollers 28 may be separated from the rotary encoder 14 by the first predetermined distance 16 or another selected distance which may be the same or different for each transfer roller 28. As shown in FIGS. 5 and 6, the transfer belt 22 engages between each transfer roller 28 and the object 12, and the plurality of transfer rollers 28 support at least a portion of the transfer belt 22 against the object 12. In this manner, the portion of the transfer belt 22 supported against the object 12 remains engaged with the object 12 even in the presence of a slot 32 or other indention on the surface of the object 12 so that the transfer belt 22 moves in sync with the object 12.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A measurement system for measuring a dimension of an object, comprising:
    a rotary encoder;
    a rotatable wheel connected to said rotary encoder;
    a first transfer roller separated from said rotary encoder by a first predetermined distance;
    a connector having an inner surface opposed to an outer surface;
    wherein said connector engages with said rotatable wheel so that said connector moves in sync with said rotatable wheel; and
    wherein said connector engages between said first transfer roller and the object so that said connector moves in sync with the object.

2. The measurement system as in claim 1, further comprising a second transfer roller separated from said rotary encoder by a second predetermined distance, wherein said first and second transfer rollers support at least a portion of said connector against the object so that said connector moves in sync with the object.

3. The measurement system as in claim 2, wherein said first predetermined distance is equal to said second predetermined distance.

4. The measurement system as in claim 1, wherein said inner surface of said connector engages with said rotatable wheel so that said connector moves in sync with said rotatable wheel.

5. The measurement system as in claim 1, wherein said outer surface of said connector engages with said rotatable wheel so that said connector moves in sync with said rotatable wheel.

6. The measurement system as in claim 5, further comprising a plurality of tension rollers that support at least a portion of said outer surface of said connector against said rotatable wheel so that said connector moves in sync with said rotatable wheel.

7. A measurement system for measuring a dimension of an object, comprising:
    a rotary encoder separated from the object by a first predetermined distance;
    a rotatable wheel connected to said rotary encoder;
    a connector having an inner surface opposed to an outer surface;
    wherein said connector engages with said rotatable wheel and the object so that said rotatable wheel moves in sync with the object.

8. The measurement system as in claim 7, wherein said inner surface of said connector engages with said rotatable wheel so that said connector moves in sync with said rotatable wheel.

9. The measurement system as in claim 7, wherein said outer surface of said connector engages with said rotatable wheel so that said connector moves in sync with said rotatable wheel.

10. The measurement system as in claim 7, further comprising a plurality of transfer rollers, wherein said plurality of transfer rollers support at least a portion of said connector against the object so that said connector moves in sync with the object.

11. The measurement system as in claim 7, further comprising a plurality of tension rollers that support at least a portion of said outer surface of said connector against said rotatable wheel so that said connector moves in sync with said rotatable wheel.

12. A measurement system for measuring a dimension of an object, comprising:
    a rotary encoder separated from the object by a first predetermined distance;
    a rotatable wheel connected to said rotary encoder; and
    a means for engaging said rotatable wheel to the object so that said rotatable wheel moves in sync with the object.

13. The measurement system as in claim 12, wherein said means for engaging said rotatable wheel to the object comprises a transfer belt having an inner surface opposed to an outer surface, wherein said transfer belt engages with said rotatable wheel so that said transfer belt moves in sync with said rotatable wheel.

14. The measurement system as in claim 13, wherein said inner surface of said transfer belt engages with said rotatable wheel so that said transfer belt moves in sync with said rotatable wheel.

15. The measurement system as in claim 13, wherein said outer surface of said transfer belt engages with said rotatable wheel so that said transfer belt moves in sync with said rotatable wheel.

16. The measurement system as in claim 13, wherein said means for engaging said rotatable wheel to the object comprises a plurality of transfer rollers, wherein said plurality of transfer rollers support at least a portion of said transfer belt against the object so that said transfer belt moves in sync with the object.

17. The measurement system as in claim 13, further comprising a plurality of tension rollers that support at least a portion of said outer surface of said transfer belt against said rotatable wheel so that said transfer belt moves in sync with said rotatable wheel.

* * * * *